No. 783,374. PATENTED FEB. 21, 1905.
C. P. A. FRIBERG.
PLANTER.
APPLICATION FILED AUG. 30, 1904.
4 SHEETS—SHEET 4.
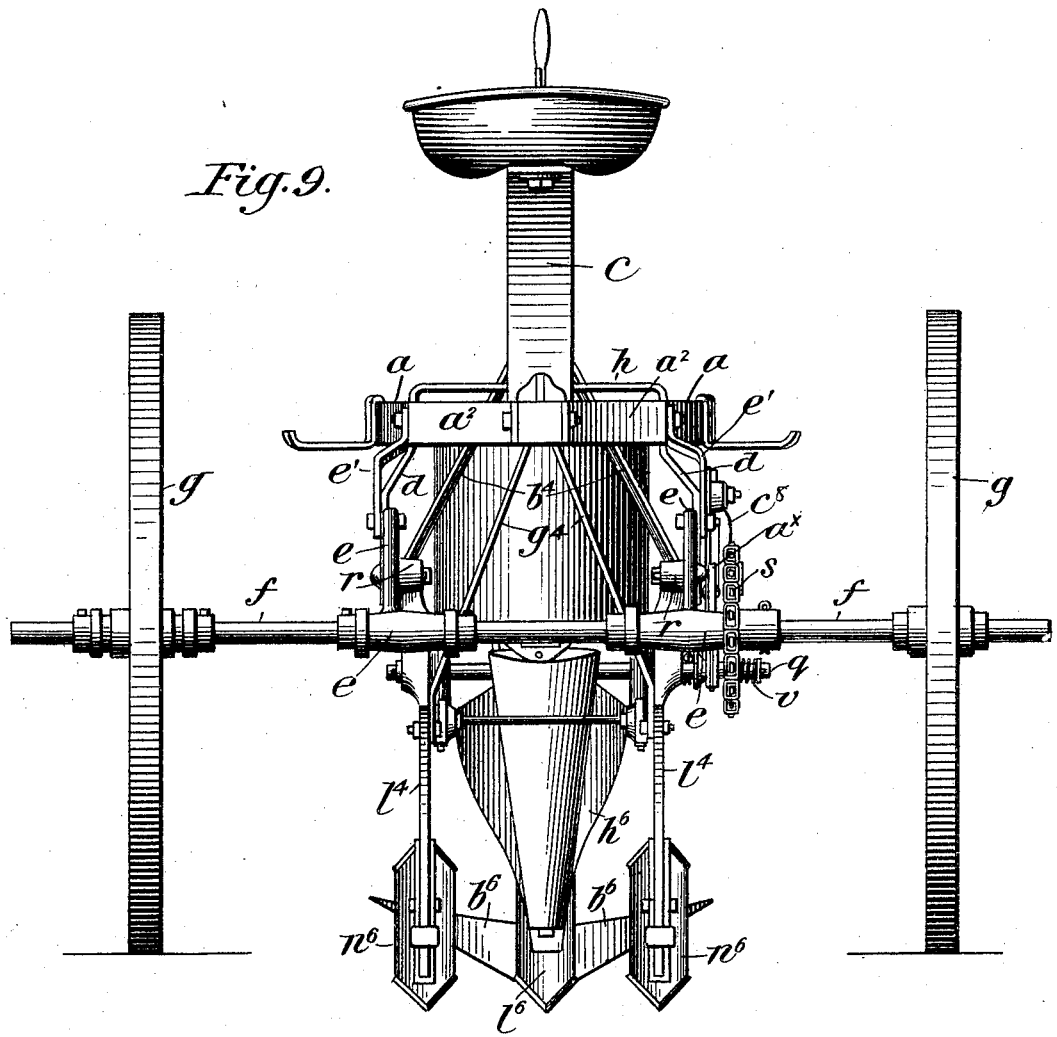

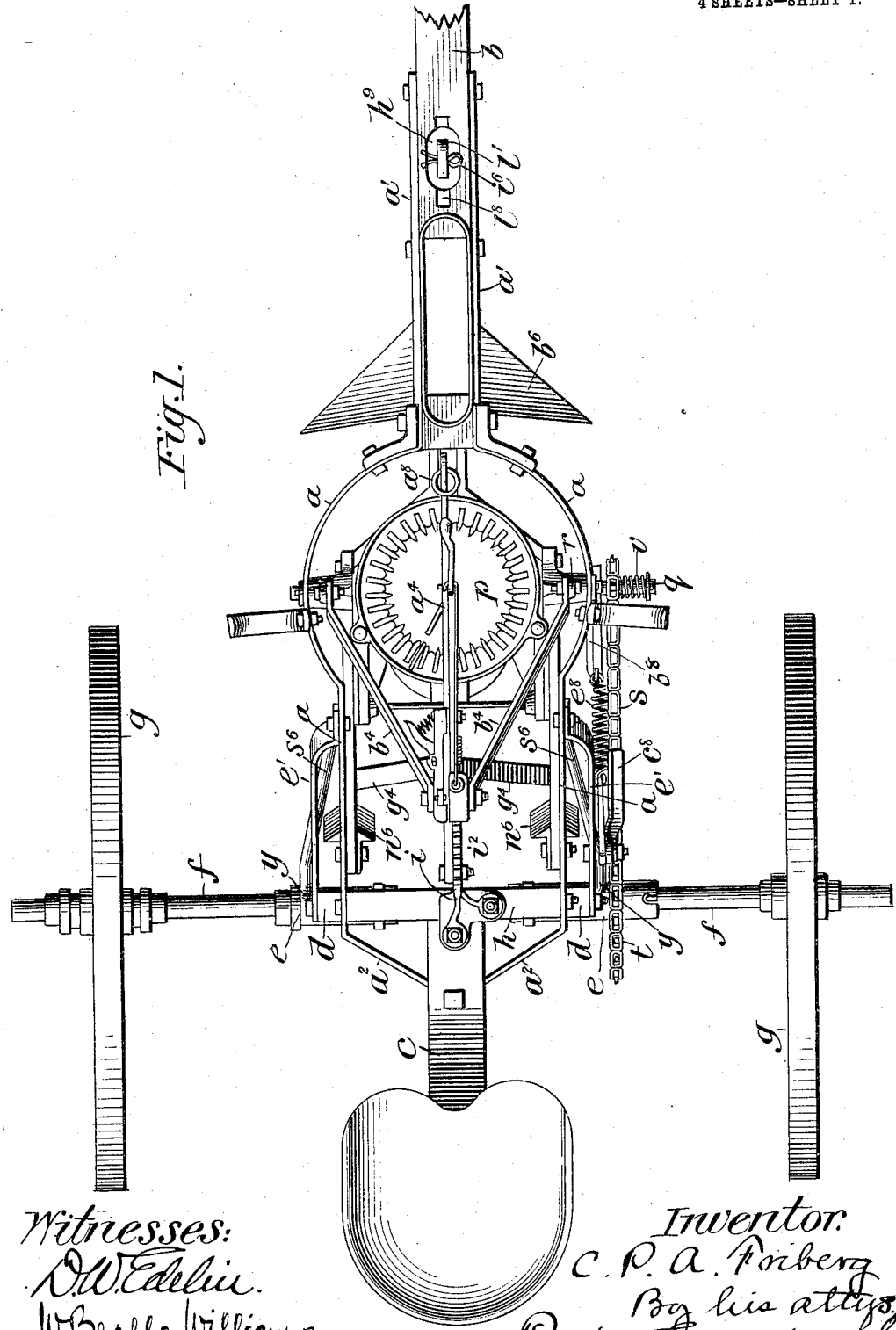

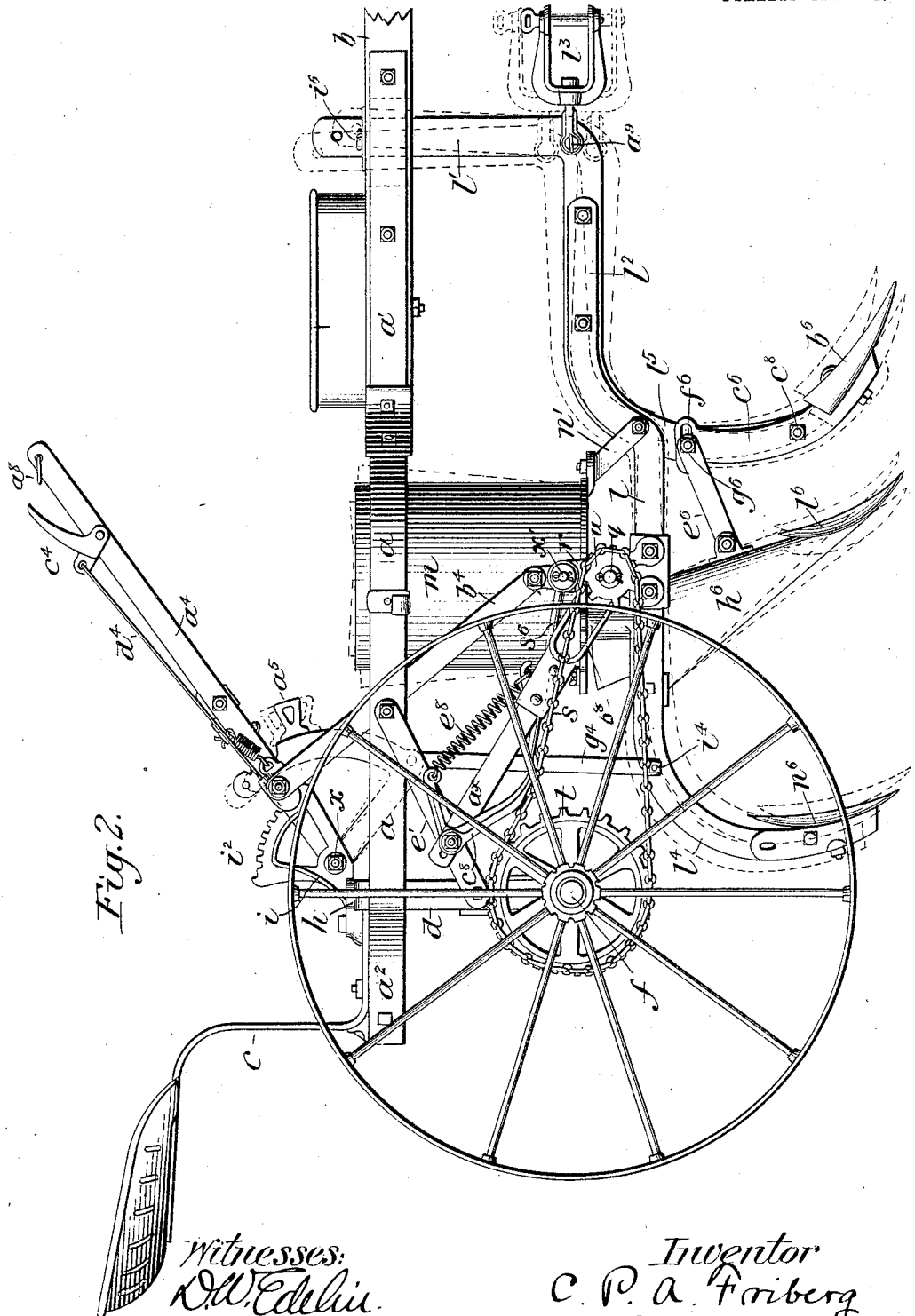

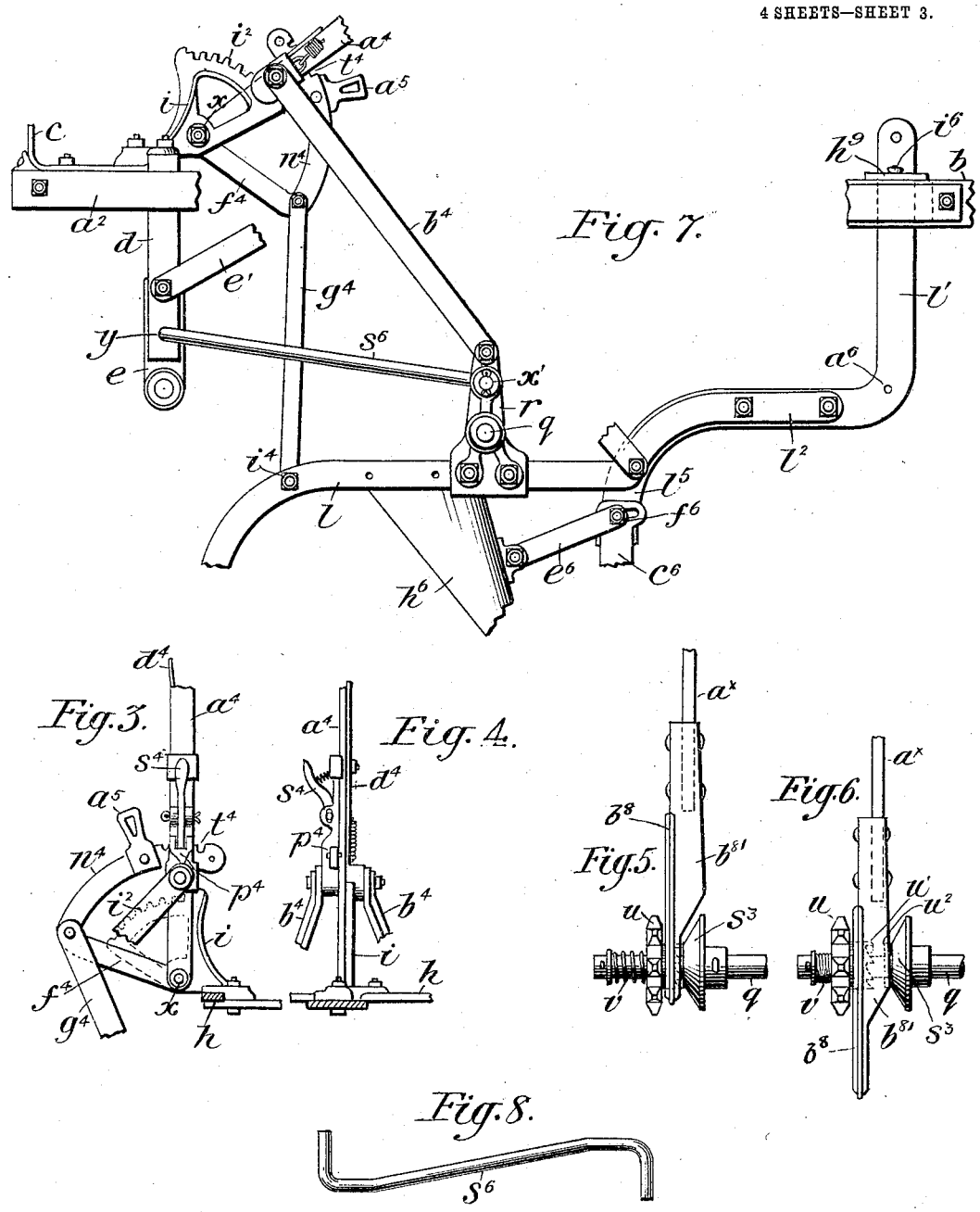

No. 783,374.

Patented February 21, 1905.

UNITED STATES PATENT OFFICE.

CHARLES P. A. FRIBERG, OF MOLINE, ILLINOIS.

PLANTER.

SPECIFICATION forming part of Letters Patent No. 783,374, dated February 21, 1905.

Application filed August 30, 1904. Serial No. 222,716.

*To all whom it may concern:*

Be it known that I, CHARLES P. A. FRIBERG, a citizen of the United States, residing at Moline, county of Rock Island, State of Illinois, have invented certain new and useful Improvements in Planters; and I do hereby declare the following to be a full, clear, and exact description of the invention, such as will enable others skilled in the art to which it appertains to make and use the same.

The invention relates to that class of machines that are adapted to plant either corn or cotton and are convertible from one kind of work to the other without change in any of the parts except the substitution of the appropriate seed-dropping devices.

The novel features of the invention are confined to the manner of mounting and operating the opener, the seedbox, the seed-spout shovel, and the covering-hoes. The seed-dropping devices and their driving mechanism (except a certain arrangement hereinafter described for throwing them out of operation) are old and well known.

According to the present invention the front middle sweep or opener, the seedbox, its spout and shovel, and the rear covering-hoes are all mounted on a frame that is supplemental to the main frame of the machine and may be raised or lowered bodily, so as to vary the depth to which all the working parts enter the ground, and which may also be tilted in a fore-and-aft vertical plane, so as to allow considerable range of variation in the depth of cut of the front sweep, or "middle breaker," as it is called, without materially altering the vertical position or depth of cut of the seed-spout shovel and the covering-hoes. This supplemental frame is suspended from a wheel-frame that has a rigid tongue and is controlled by adjusting-levers that are adapted to be locked, so as to set the frame higher or lower, and the draft devices are connected to the front end of the supplemental frame. The adjusting-lever, which raises and lowers the frame bodily, may be thrown out of action, so as to allow the frame to rest normally on the ground and to have a floating action when in operation, due to the team drawing upon it.

The invention is illustrated in the accompanying drawings, wherein—

Figure 1 shows the entire machine in plan. Fig. 2 is a side elevation of the machine, the supplemental frame being shown tilted to different positions in dotted lines. Figs. 3 and 4 are respectively side and rear edge views showing parts of the levers for raising and lowering the frame and tilting it as above described. Fig. 5 is a detail in plan of the arrangement for throwing out of operation the seed-dropping devices when the supplemental frame reaches the limit of its upward adjustment. Fig. 6 is a detail view of the same parts looking from the front of the machine. Fig. 7 is a fragmentary view of the main and supplemental frames of the machine in side elevation, so as to better illustrate the adjustments of the supplemental frame. Fig. 8 is a detail view of one of the side bars which connect the supplemental and main frames; and Fig. 9 is a rear view of the machine, intended more particularly to show the manner of connecting these side bars to the two frames.

Referring to the views, $a$ denotes the wheel-frame. It is composed of side bars and has a front extension $a'$, to which the tongue $b$ is rigidly secured, and a rear extension $a^2$, to which the seat-spring $c$ is connected. Depending from this frame on each side are vertical standards $d$, that are rigidly secured at their lower ends to sleeve-castings $e$ and are braced by diagonal braces $e'$. The axle $f$ of the supporting-wheels $g$ is journaled in these castings $e$, and the standards are preferably continuous with a cross-bar $h$, which extends between the side bars and under which the front end of the seat-spring $c$ is secured and to the upper side of which a rack $i$ is fastened, to which are pivoted the levers for vertically adjusting and tilting the supplemental frame. This wheel-frame is rigid with the tongue and axle supports and constitutes the main frame of the machine. The supplemental frame $l$ consists of side bars, a front extension $l^2$, to which the draft device $l^3$ is connected, and rear end bars $l^4$.

The seed-hopper $m$, which is of the usual construction, is mounted upon this supplemental frame in fixed position, being rigidly secured thereto by brackets $n'$. As here shown, the hopper is provided with the usual toothed stirrer-plate $p$ for planting cotton, and this plate is operated from a shaft $q$, which is journaled in vertical standards $r$, rising from the side bars of the supplemental frame, the shaft being driven from the axle $f$ by means of a chain $s$, which is thrown around a sprocket-wheel $t$, that is fast on the axle, and a sprocket-pinion $u$, which is loose on the shaft $q$ and is held normally in engagement with the shaft by means that will presently be described.

The rack $i$, before referred to, is located in the center line of the machine in front of the driver's seat. There is pivoted to it at $x$ a hand-lever $a^4$, and from a point on the hand-lever above its pivot extend diagonally downward and forward two supporting-links $b^4$, one on each side, which connect with the supplemental frame by being pivotally attached at their lower ends to the upper ends of the standards $r$, that are secured to the side bars of the frame. The rack $i$ has a notched segment $i^2$ formed on it, and the hand-lever $a^4$ is provided with a pivoted latch $c^4$ at its upper end and a locking-rod $d^4$, which engages in the usual way with the notches of the segment $i^2$, so as to lock the lever $a^4$ in different positions, as indicated in Figs. 2, 3, and 7. The rack $i$ has also pivoted to it at the point $x$ a short lever $f^4$, and from the front end of this lever a pair of supporting-links $g^4$ extend downward and are pivotally connected at $i^4$ to the side bars of the supplemental frame. The lever $f^4$ has a curved bar $n^4$, extending upwardly and rearwardly from its outer end and passing through a keeper $p^4$, secured to the left-hand side of hand-lever $a^4$. The bar $n^4$ is provided with notches $t^4$, like the segment of the rack $i$, and the hand-lever $a^4$ has a spring-pressed latch $s^4$, pivoted to the keeper $p^4$ and having its lower end passing through a slot in the keeper and engaging the notches $t^4$ of the bar so as to lock the lever $f^4$ in different positions of adjustment relatively to the lever $a^4$. A handhold $a^5$ is provided on the curved bar $n^4$ to enable the driver to raise and lower the lever $f^4$ independently of the hand-lever $a^4$.

The purpose of the lever $a^4$ is to raise and lower the supplemental frame bodily, and it is to be noted in this connection that the standards $r$, to which the supporting-links $b^4$ are connected, are located at the center of weight of the supplemental frame and its supported parts, so that in lifting the frame by the lever $a^4$ there will be no tendency to tilt the frame.

In the raising and lowering of the frame the lever $f^4$ of course moves with the lever $a^4$, and the links $g^4$, which extend from the front end of the lever $f^4$ downward to the supplemental frame, serve to prevent the frame from tilting as it moves up and down and preserve its horizontal position during its various vertical adjustments.

The purpose of the lever $f^4$ is primarily, however, to effect the tilting of the supplemental frame in the manner indicated in dotted lines in Fig. 2. The dual capacity of the lever $f^4$ and links $g^4$ to act as a guide and controller for the supplemental frame as it is vertically adjusted and also as an independent tilting adjustment for the frame is due to its capacity for independent or concurrent adjustment with the raising and lowering lever $a^4$, and it is to be noted in this respect that no matter what the position of the lever $a^4$ or the elevation of the supplemental frame may be the lever $f^4$ may be operated to the full extent, so as to effect whatever tilting of the frame it is desired to accomplish.

The seed-hopper, as before described, is mounted in fixed position on the supplemental frame, and the frame also carries the sweep $b^6$, constituting the middle breaker or "front opener," as it is frequently called. This sweep is adjustably connected to an arm $c^6$, which is pivoted to the lower arm $l^5$ of a gooseneck that is clamped between the front extensions $l^2$ of the supplemental frame and has its upper end $l'$ carried forward and then vertically up through a slot $l^8$ in the tongue. The end $l'$ plays loosely in the slot and has a plate $h^9$ slipped over its upper end, with a cotter $i^6$ above it to limit the downward movement of the front end of the frame $l$.

It is very desirable that the front opener should be adjustable in position independently of the vertical elevation or the inclined position of the supplemental frame, so that the suction of the sweep may be regulated as the condition of the ground requires. For this purpose the arm $c^6$ is pivoted at $c^8$ to the arm $l^5$ by a bolt-and-slot connection $f^6$ with a bolt $g^6$, by means of which the inclination of the arm $c^6$ and the suction of the sweep may be varied as circumstances require.

The seed-spout $h^6$ is mounted in the usual position and is braced from the supplemental frame by the diagonal brace $e^6$, that is secured at its other end to the bar $l^5$ by the same bolt $g^6$ that adjusts the sweep-arm $c^6$. It has upon its lower end the usual shovel $l^6$.

At the rear of the seed-spout and in the usual position with respect to its shovel are the covering-hoes $n^6$. They are adjustably secured to bars $l^4$, which curve rearwardly and downwardly from the side bars $l$ of the supplemental frame.

As thus far described, it will be understood that the supplemental frame is entirely supported from the main frame by means of the links $f^4$ and $g^4$. For the purpose, however, of further strengthening the support, and particularly to steady it against lateral strains, it is connected to the main frame by side bars

$s^6$. These bars are shaped as shown in Fig. 8, with their ends bent at right angles to the body portion in opposite directions. The front ends of the bars are connected with the standards $r$ at each side of the supplemental frame at the point $x'$, and at their rear ends they are connected to the lower end of the standards $d$ at $y$. The ends of the bars being pivotally connected to the respective parts and the points to which their rear ends are connected being considerably farther apart than the standards $r$, thereby spraddling the rear ends of the bars, they serve to very considerably stiffen the shovel-carrying frame and hold it against sidewise strains and tendency to lateral displacement.

As before described, the draft of the team is connected to the front end of the supplemental frame instead of to the tongue or wheel frame. This connection is made by the clevis $l^3$, attached to the gooseneck at $a^9$, as shown in Fig. 2, and the devices for locking the raising and lowering lever are adapted to be thrown out of operation and locked, so that the supplemental frame may be allowed to rest with its own weight upon the ground and to float therealong under the action of the draft of the team. For this purpose the upper end of the lever $a^4$ is provided with a pivoted link or bar $a^8$, which is adapted to catch over the upper end of the latch $c^4$ and hold the locking-rod $d^4$ out of engagement with the notches of the segment $i^2$. When thus adjusted, the supplemental frame and the opening and covering hoes carried thereby are free to rise and fall, and the lever $f^4$ being locked to the raising and lowering lever $a^4$ the slight up-and-down movement of the frame in operation would remain horizontal.

It is to be noted in respect to the tilting movement of the supplemental frame that the shaft $q$ forms the center around which this movement is effected, this being due to the pivotal points of connection between the frame and the supporting-links $b^4$ and $g^4$ and the bars $s^6$, and the location of this tilting point in the center of the frame immediately above the seed-spout shovels allows the frame to be tilted either up or down with the least possible variation in the vertical position of the shovels $l^6$. This will be readily understood on reference to Figs. 2 and 7, where it will be seen that owing to the greater distance of the front opener $b^6$ from the vertical plane of the frame's pivot than the seed-spout shovel $l^6$ the opener will move when the frame is tilted a distance greatly in excess of that of the spout-shovel. It will also be noted that the covering-shovels are located much nearer the plane of the pivotal line of the frame than the front opener and that consequently when the frame is tilted these covering-hoes also have an inconsiderable vertical elevation compared with that of the front opener.

It is desirable that the motion of the seed-dropping devices should be discontinued when the supplemental frame is raised to its highest point, and the invention contemplates the automatic disconnection of the shaft $q$ from its driving-sprocket pinion $u$ in the following manner: The pinion, as before described, is loosely mounted on the shaft; but it has a hub $u'$ with clutch-teeth on it, and the spring $v$ tends to force the pinion along the shaft so that the teeth of its hub will engage a pin $u^2$ in the shaft and lock the pinion to the shaft. The driving-pinion $u$ is on the end of the shaft outside of the standard $r$, and an automatic shipper is located between the pinion and a spool or cone $s^3$ on the shaft, so that when the frame is raised to its highest point it will disconnect the clutch-hub of the pinion from the pin in the shaft and permit the seed-dropping devices to discontinue their operation. This shipper consists of a bar $a^\times$, that is pivoted at its rear end to the brace $e'$ and extends downwardly and forwardly and has a slotted yoke $b^{81}$ at its forward end that straddles the shaft. The yoke has a cam $b$ of sufficient width to separate the pinion from the pin $u^2$. In the vertical adjustment of the supplemental frame the distance between the pivot of the bar $a^\times$ and the pinion $u$ diminishes; but the cam $b^{81}$ is located on the bar, so that the rising of the frame will not cause the pinion to be disconnected from the shaft until the upward limit of the frame's movement has been reached. In this manner the disconnection of the dropping devices is made entirely automatic, and the spring $v$ causes the reengagement of the driving-pinion with the shaft as soon as the frame has been lowered sufficiently to withdraw the cam $b^{81}$ from between the pinion and the cone $r$. As the frame rises the chain $s$ will be slackened somewhat, and in order to keep it at a uniform tension an automatic tightener is provided. This consists of a bell-crank lever $c^8$, which is pivoted to the brace $e'$ and has its longer arm bearing down upon the upper ply of the chain and its shorter arm connected by a spring $e^8$ to some point forward of the arm, preferably to the shipper-bar $a^\times$. The spring causes the long arm of the tightener to bear constantly upon the chain, and as the supplemental frame is raised this movement tightens the spring and causes it to take up whatever slack there may be produced in the chain in consequence of the upward movement of the shaft $q$.

Having thus described my invention, what I claim is—

1. In a wheeled planter, the combination of the main frame, a tongue rigidly connected thereto, and a supplemental frame suspended from the main frame and carrying the seed-spout and shovel, the front sweep or opener, and the covering-hoes, the frame being adjustable bodily to different elevations.

2. In a wheeled planter, the combination of the main frame, having a rigid tongue, a supplemental hoe and shovel carrying frame, suspended therefrom, means for raising and lowering the supplemental frame, and means for preserving the horizontal position of the frame.

3. In a wheeled planter, the combination of the main frame having a rigid tongue, a supplemental hoe and shovel carrying frame, suspended therefrom, means for adjusting bodily the vertical position of the supplemental frame, and means for tilting said frame to different inclinations on a transverse axis in its various vertical adjustments.

4. In a wheeled planter, the combination of the main frame having a rigid tongue, a supplemental frame suspended therefrom and carrying the seed-spout shovel, the front sweep or opener, and the covering-hoes, a draft connection at the front end of the supplemental frame, and means for locking the frame in a given position or releasing it and allowing it to float in operation.

5. In a wheeled planter, the combination of the main frame having a rigid tongue, a supplemental frame suspended therefrom and carrying a front sweep or opener, means for tilting the frame on a transverse axis, and means for adjusting the inclination of the sweep independently of the adjustments of the frame.

6. In a wheeled planter, the combination of the main frame having a rigid tongue, a supplemental frame pivotally connected with the main frame on a transverse axis, said supplemental frame carrying a seed-spout and shovel in substantially the vertical plane of the frame's axis, and a sweep or opener in front of the spout, and covering-hoes in rear thereof.

7. In a wheeled planter, the combination of the main frame, a supplemental hoe and shovel carrying frame, a seed hopper and dropping mechanism carried by said supplemental frame, means for raising and lowering the supplemental frame, means for driving the dropping mechanism from the axle of the machine in the different adjustments of the frame, and means for throwing the dropping mechanism out of operation at a given point in the elevation of the frame.

8. In a wheeled planter, the combination of the main frame, a supplemental hoe and shovel carrying frame, a seed hopper and dropping mechanism carried by said supplemental frame, means for raising and lowering the supplemental frame, a transverse dropper-shaft journaled in the supplemental frame, a sprocket-wheel fast on the machine-axle, a sprocket-pinion loose on the dropper-shaft but held normally clutched thereto, a chain driving the pinion from the wheel on the axle, and a shipper-bar $a^x$ having a cam-shaped front end $b^{81}$ for unclutching the dropper-shaft pinion when the frame reaches its highest elevation.

9. In a wheeled planter, the combination of the main frame, a supplemental hoe and shovel carrying frame, a seed hopper and dropping mechanism carried by said supplemental frame, means for raising and lowering the supplemental frame, a transverse dropper-shaft journaled in the supplemental frame, a sprocket-wheel fast on the machine-axle, a sprocket-pinion on the dropper-shaft driven by a chain from the wheel on the axle, and a spring-held tightener bearing on the chain and serving to keep it at a uniform tension in the various adjustments of the frame.

10. In a wheeled planter, the combination of the main frame, a supplemental hoe and shovel carrying frame suspended from the main frame, and horizontal bars $s^6$ pivotally connecting the supplemental frame at the sides with the main frame, said bars serving to brace the supplemental frame against lateral strains.

11. In a wheeled planter, the combination of the main frame, a supplemental hoe and shovel carrying frame, an adjusting-lever mounted on the main frame and connected by pivoted links $b^4, b^4$ with the supplemental frame at substantially the center of its length, a tilting lever also mounted on the main frame, pivoted links $g^4, g^4$ connecting the tilting lever with the rear part of the supplemental frame, and means for locking the adjusting and tilting levers together so as to raise or lower the supplemental frame bodily, the tilting lever being operatable independently of the adjusting lever to tilt the supplemental frame.

12. In a wheeled planter, the combination of the main frame, a supplemental hoe and shovel carrying frame, a raising and lowering lever $a^4$ connected by pivoted links $b^4, b^4$ with the supplemental frame at substantially the center of its length, a tilting lever $f^4$ connected to the rear part of the supplemental frame by pivoted links $g^4, g^4$, a notched segment $i^2$ on the main frame to which the raising and lowering lever may be locked in different positions, and a notched segment $n^4$ on the tilting lever, the segment $n^4$ having an adjustable locking connection with the raising and lowering lever, and both levers being pivoted on the main frame on the same axis.

In testimony whereof I affix my signature in presence of two witnesses.

CHARLES P. A. FRIBERG.

Witnesses:
N. GALVIN,
N. A. PETERSON.